United States Patent
Küpper et al.

(10) Patent No.: US 6,205,874 B1
(45) Date of Patent: Mar. 27, 2001

(54) TRANSMISSION FOR USE IN POWER TRAINS OF MOTOR VEHICLES

(75) Inventors: Klaus Küpper, Bühl; Thomas Pfund, Greffern; Martin Zimmermann, Sasbach, all of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/250,692

(22) Filed: Feb. 16, 1999

(30) Foreign Application Priority Data

Feb. 16, 1998 (DE) .............................. 198 06 239
Apr. 28, 1998 (DE) .............................. 198 18 939

(51) Int. Cl.$^7$ .................................................. F16H 59/08
(52) U.S. Cl. .................................................. 74/335
(58) Field of Search .......................... 74/335, 336 R; 200/151

(56) References Cited

U.S. PATENT DOCUMENTS

| | | | |
|---|---|---|---|
| Re. 34,064 | * | 9/1992 | Tury et al. .............................. 74/335 |
| 4,905,530 | * | 3/1990 | Stehle et al. ............................. 74/335 |
| 4,987,792 | * | 1/1991 | Mueller et al. ..................... 74/335 X |
| 5,725,456 | | 3/1998 | Fishcer et al. . |
| 5,809,835 | * | 9/1998 | Beim et al. ............................. 74/335 |
| 5,845,535 | * | 12/1998 | Wakabayshi ....................... 74/335 X |
| 5,861,803 | * | 1/1999 | Issa ..................................... 74/335 X |

FOREIGN PATENT DOCUMENTS 37 17 675 C2   9/1994 (DE) .

\* cited by examiner

*Primary Examiner*—Sherry Estremsky
(74) *Attorney, Agent, or Firm*—Darby & Darby (57) ABSTRACT

The positions of a gear selecting lever in a combined automatically and manually shiftable transmission which is installed in the power train of a motor vehicle are monitored by a first sensor which transmits signals to a control circuit serving to initiate the operation of an actuator for the gear selecting lever. Certain positions of the lever are monitored and reported to the control circuit by one or more additional sensors which influence the operation of the actuator in the event of failure of the first sensor. One of the additional sensors can monitor a first range of positions of the lever including the position when the transmission is shifted into reverse gear, and another additional sensor can monitor a second range of positions of the lever including the position when the transmission is in neutral gear.

48 Claims, 4 Drawing Sheets

TRANSMISSION FOR USE IN POWER TRAINS OF MOTOR VEHICLES

BACKGROUND OF THE INVENTION

The invention relates to improvements in transmissions for use in the power trains of motor vehicles, and more particularly to improvements in so-called hybrid or composite transmissions which can be shifted into selected gears automatically as well as manually.

Published German patent application Serial No. 37 17 675 discloses a transmission wherein a gear assembly is shiftable into and between a plurality of gears (including reverse, neutral and forward gears) by a shifting means including a gate defining first and second gear selecting paths and a gear selector which is movable along the first path between a plurality of positions including first, second and third positions in which the assembly is respectively in reverse, neutral and forward gears. The gear selector is movable between the aforementioned third position and the second path and manually between different positions along the second path. The gear shifting means further comprises a signal receiving, processing and transmitting control unit, at least one actuator which is responsive to signals from the control unit and is arranged to move the shifting device to a selected one of the plurality of gears as a function of the characteristics of signals being transmitted by the control unit, and at least one sensor which is set up to monitor the positions of the selector in the first and/or second path and to transmit corresponding signals to the control unit.

An advantage of the above outlined transmission is that, when the selector (such as a lever) is to shift the transmission into reverse, neutral or forward gear, such manipulation of the shifting device can be effected by the at least one actuator automatically in response to signals which are being transmitted to the control unit by the at least one sensor. When the gear assembly has been shifted into a forward gear, the lever can be moved into the second path for manual advancement to a selected position in the second path.

Transmissions embodying the above outlined gear assemblies and the combined automatic and mechanical shifting means therefor enjoy an increasing popularity.

The disclosure of the published German patent application Serial No. 37 17 675 is incorporated herein by reference.

OBJECTS OF THE INVENTION

An object of the invention is to provide a hybrid or composite transmission of the above outlined character which can stand long periods of use without excessive wear upon the bearings and/or other component parts of the transmission and/or other constituents of the power train in a motor vehicle.

Another object of the invention is to provide a reliable composite transmission which does not increase (but can actually reduce) the frequency of accidents attributable to malfunctioning of the sensor or sensors which monitor the positions of the gear selector.

A further object of the invention is to provide a reliable hybrid transmission with a highly satisfactory interaction between the automatic and manual controls for the gear assembly.

An additional object of the invention is to provide a transmission whose operation is satisfactory for short or long intervals of time following a malfunctioning of the gear assembly or certain other constituents, for example, one or more signal generating devices which initiate the automatic shifting of the transmission into selected or desired gears.

Still another object of the invention is to provide a transmission which constitutes an improvement over and a further development of the transmission disclosed in the aforementioned published German patent application Serial No. 37 17 675.

A further object of the invention is to provide a novel and improved method of operating a hybrid (partly automatically and partly manually shiftable) transmission for use in the power trains of motor vehicles.

SUMMARY OF THE INVENTION

One of several important features of the present invention resides in the provision of a transmission which can be utilized in the power train of a motor vehicle and comprises (a) a gear assembly which is shiftable into and between a plurality of gears including reverse, neutral and forward gears, and (b) means for shifting the gear assembly to and between the various gears. The shifting means comprises a gate which defines first and second gear selecting paths, a gear selector which is movable along the first path to a plurality of positions including first, second and third positions in which the assembly is respectively in the aforementioned reverse, neutral and forward gears (the selector is movable between its third position in the first path and the second path and manually along the second path), a signal receiving, processing and transmitting control unit, at least one actuator which is responsive to processed signals transmitted by the control unit and is arranged to move the shifting device to one of the plurality of gears as a function of the characteristics of signals transmitted by the control unit, at least one first sensor which is arranged to monitor the positions of the selector in the two paths and to transmit signals to the control unit, and at least one additional sensor which is arranged to monitor the presence or absence of the selector in a predetermined one of the plurality of positions and to transmit signals to the control unit.

The predetermined position of the plurality of positions of the selector in the first path is or can be one of the first, second and third positions.

At least one of the sensors can include or constitute a pushbutton or a switch, e.g., a touch-free (i.e., not mechanically actuated) switch of the type known as Hall effect senor or reed switch. Furthermore at least one of the sensors can include or constitute a switch which is actuatable by the selector to transmit signals to the control unit; the switch actuating means of the selector can include a cam or the like.

In accordance with another feature of the invention, the means for shifting the gear assembly can comprise at least one further sensor which is arranged to monitor the presence or absence of the selector in another of the purality of positions in the first path and to transmit signals to the control unit. As already mentioned above, the predetermined position of the plurality of positions of the selector can be one of the first, second and third positions; the other of the plurality of positions (namely the position which is monitored by the at least one further switch) is or can be one of the first, second and third positions. At least one of the at least one first sensor, at least one additional sensor and at least one further sensor can include or constitute a pushbutton or a switch, e.g., a touch-free switch (such as a Hall effective sensor or a reed switch) or a switch which is actuatable by a cam or the like on or of the selector to transmit signals to the control unit.

The selector can be set up to be movable to an intermediate position between the first and second positions in the first path, and the at least one additional sensor as well as the at least one further sensor can be arranged to monitor the intermediate position of the selector and to transmit corresponding signals to the input or inputs of the control unit.

The at least one additional sensor can be arranged to monitor the presence or absence of the selector in the first position (i.e., in the first portion of the first path) and to transmit signals to the control unit. Again, at least one of the sensors in such shifting means can include a pushbutton or a switch. If such shifting means comprises a further sensor, the latter can be arranged to monitor the presence or absence of the selector in the second position in the first path and to transmit signals to the control unit. The at least one first sensor and/or the at least one additional sensor and/or the at least one further sensor of such shifting means can comprise or constitute a pushbutton or a switch of the previously described character. If the selector has an intermediate position between the first and second positions in the first path, the at least one additional sensor and the at least one further sensor can be set up to monitor the intermediate position of the selector and to transmit appropriate signals to the control unit.

The transmission can be designed in such a way that, when moved from the third portion of the first path into the second path, the selector can move to a selected one of several positions in the second path. The at least one further sensor of the shifting means in such transmission can be arranged to monitor the presence or absence of the selector in one selected position of the selector in the second path and to transmit appropriate signals to the control unit. The gear assembly can be designed in such a way that it has a plurality of higher and lower forward gears or gear ratios (e.g., first, second, third, fourth and fifth forward gears), and the selected positions of the selector in the second path can include an idle position, a position in which the selector effects a shifting of the gear assembly from a higher to a lower forward gear, and a position in which the selector effects a shifting of the gear assembly from a lower to a higher forward gear.

At least one sensor in the just described embodiment of the transmission can constitute or include a pushbutton or a switch, e.g., a switch of the aforedescribed type including touch-free switches and switches actuatable by the selector of the shifting means.

Furthermore, and if the selector has an intermediate position between the first and second positions in the first path, the at least one additional sensor and/or the at least one further sensor can be set up to monitor the intermediate position of the selector in the first path and to transmit corresponding signals to the control unit. The latter can constitute or include an electronic circuit which, in addition to signals from the aforementioned at least one first sensor and/or at least one additional sensor and/or at least one further sensor, can also receive signals from one or more other sensors which monitor linear and/or other movements, the RPM and/or other characteristics of one or more parts in the transmission and/or other constituents (e.g., the engine) of the power train in a motor vehicle.

The novel features which are considered as characteristic of the invention are set forth in particular in the appended claims. The improved transmission itself, however, both as to its construction and the modes of assembling and operating the same, together with numerous additional important features and attributes thereof, will be best understood upon perusal of the folowing detailed description of certain presently preferred specific embodiments with reference to the accompanying drawings.

DESCRIPTION OF PREFERRED EMBODIMENTS

Figure 1:
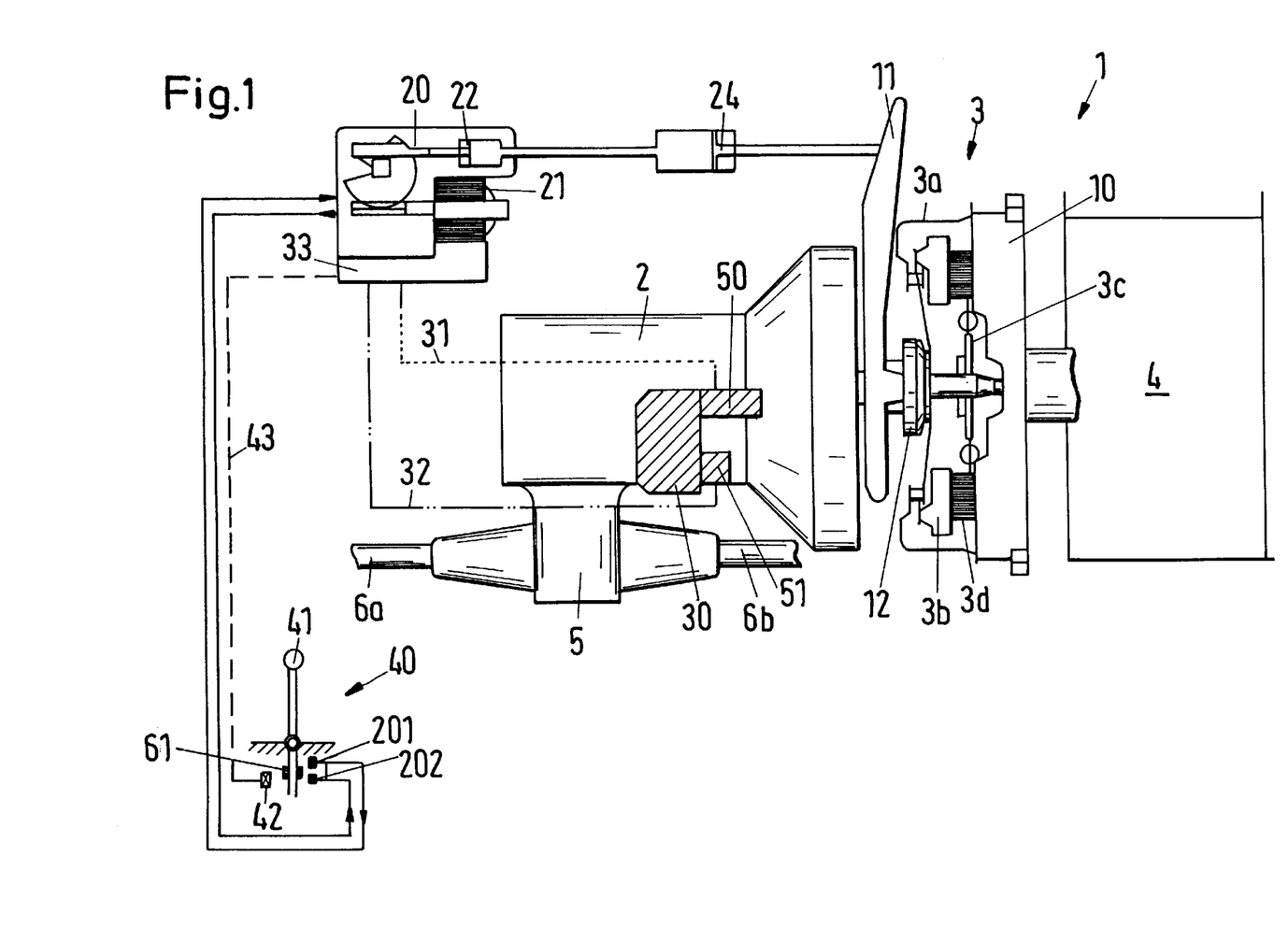
FIG. 1 is a schematic plan view of a power train in a motor vehicle wherein the shifting of the transmission into selected gears can be effected in accordance with an embodiment of the invention.

FIG. 1 shows certain relevant component parts of a power train 1 which is installed in a motor vehicle and comprises a transmission 2 constructed, assembled and operated in accordance with the present invention. The input shaft of the transmission 2 receives torque from the clutch disc 3c of a friction clutch 3 which has a flywheel 10 driven by the output shaft (such as a camshaft or a crankshaft) of a prime mover 4, e.g., an internal combustion engine. The output shaft of the transmission 2 drives a differential 5 which, in turn, can drive the axles 6a, 6b for the front or rear wheels of the motor vehicle.

The clutch 3 further comprises a housing or cover 3a which is driven by the flywheel 10 and transmits torque to an axially shiftable pressure plate 3b which engages the clutch when it is caused to bear upon the friction linings 3d on the radially outer portion of the clutch disc 3c. The means for disengaging the clutch 3 includes a standard release bearing 12 which can be moved axially of the clutch by a pivotable lever 11.

The illustrated clutch 3 can be disengaged automatically by an actuator 20 which is operatively connected to the disengaging lever 11 by a master cylinder 22 and a slave cylinder 24. An electric motor 21 of the actuator 20 can receive signals from an electronic control unit 33 and can transmit motion to the piston in the master cylinder 22 by way of a worm (on the output shaft of the motor 21) which mates with a worm wheel arranged to shift a piston rod carrying the piston of the master cylinder 22.

The control unit 33 can comprise one or more memories and a microprocessor for signals being transmitted thereto by several sensors to be described hereinafter. The control unit 33 can be installed in the housing of the clutch actuator 20 or vice versa. The signals which are processed by the control unit 33 can be transmitted to the electric motor 21 of the clutch actuator 20 and/or to a second actuator 30 which can shift the transmission 2 into a desired gear in response to signals from the control unit 33.

The exact details of the gear assembly in the case of the transmission 2 form no part of the present invention. Such assembly is shiftable by the actuator 30 into several gears including a reverse gear R, a neutral gear N and several forward gears D. The means for actually shifting the gear assembly of the transmission 2 into desired gears comprises a gate 100 (shown in FIG. 2), the control unit 33, the actuator 30, a gear selecting or selector lever 41 (hereinafter called selector or gear selector for short) which is movable along the paths 101, 120 defined by the gate 100, and several sensors which transmit signals to the inputs of the control unit 33.

The actuator 30 of FIG. 1 comprises two electric motors 50 and 51 which can transmit motion to selected internal components of the transmission 2 (e.g., to a first component which actually selects the desired gear ratio and a second component which thereupon shifts into or from a particular gear). The electric motor 50 and/or 51 can be replaced with a pneumatic or hydraulic motion imparting drive without departing from the spirit of the present invention. Conductors 31, 32 transmit signals between the control unit 33 and the motors 50, 51, respectively.

The selector 41 forms part of the gear shifting means 40 for the gear assembly in the case of the transmission 2, and the positions of the selector 41 are monitored by a first sensor 42 which transmits appropriate signals to the control unit 33 by way of conductor means 43. The functions of an additional sensor 201 and a further sensor 202 (the sensors 201, 202 monitor certain positions of the selector 41) will be described with reference to FIGS. 2, 3 and 4.

The sensor 42 can constitute a single sensor or a set of two or more sensors, and its function is to monitor the positions of the selector 41 in the first path 101 and/or in the second path 120, both defined by the gate 100.

Figure 2:
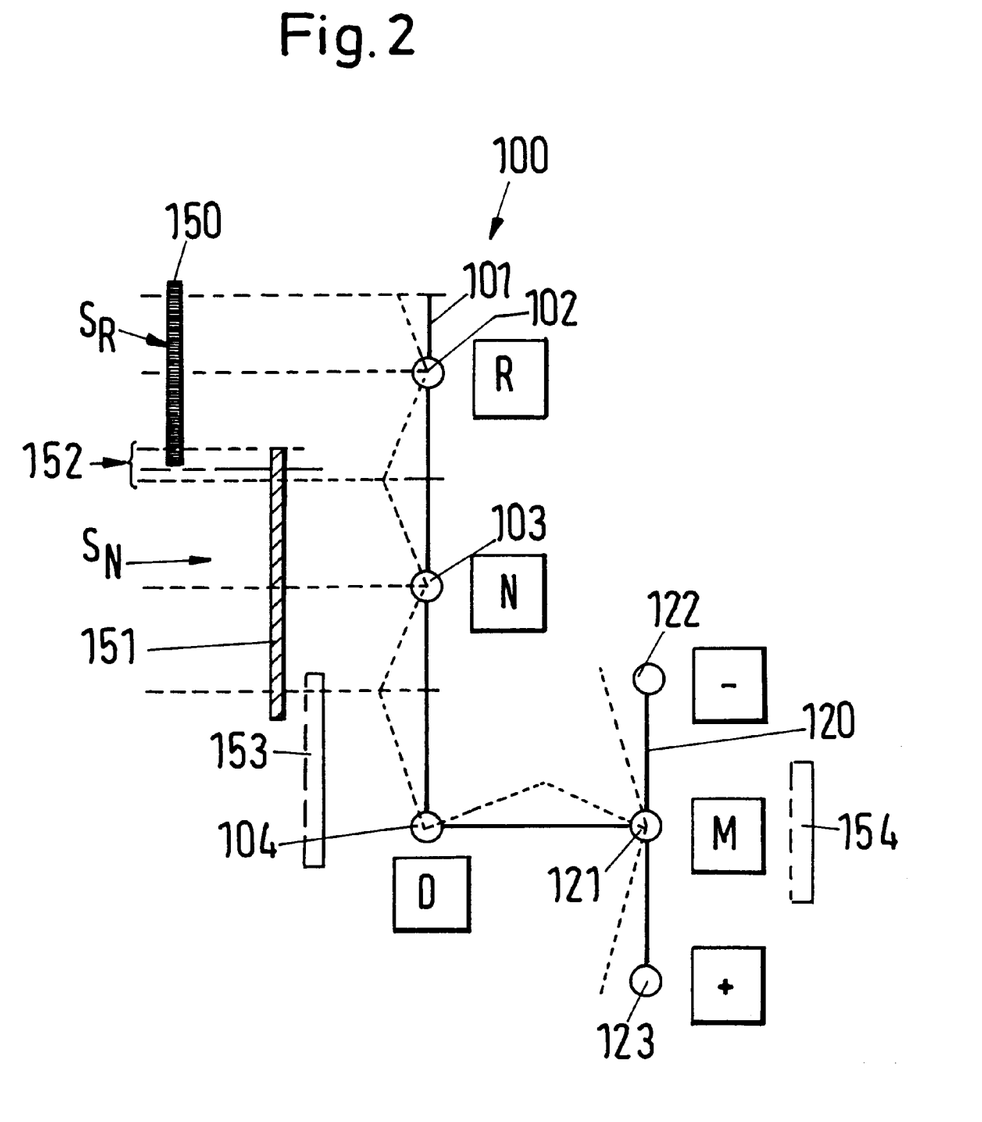
FIG. 2 is a diagrammatic view of the gate for the gear selecting lever of the transmission and further shows various positions of the selecting lever within the two paths which are defined by the gate.

Referring to FIG. 2, the selector 41 can assume (in the first path 101 of the gate 100) a first position 102 in which the gear assembly in the case of the transmission 2 is set to drive the axles 6a, 6b in reverse (R), a second position 103 in which the gear assembly is in neutral (N), i.e., the engine 4 can be idling, and at least one third position 104 in which the gear assembly is set to drive the axles 6a, 6b forwardly (D) at one of several different forward speeds.

The selector 41 is movable from the first path 101 of the gate 100 into the second path 120 when it occupies the position 104. When it assumes the position M at 121 within the second path 120, the selector 41 can be moved by hand to the (−) position 122 to thereby shift the gear assembly in the case of the transmission 2 from a higher forward gear into a lower forward gear, or to the (+) position 123 to thereby shift the gear assembly from a lower forward gear into a higher forward gear. The transmission 2 is ready to be shifted (via selector 41) by hand when the selector reaches the position M (121) in the second path 120. The control unit 33 takes over when the selector 41 is returned to the (third) position D (104) in the first path 101 of the gate 100.

By way of example, manual displacement of the selector 4 from the position 121 to the position 122 can result in a change of the transmission ratio by one step from the third forward speed to the second forward speed. On the other hand, if the selector 41 is shifted from the position 121 to the position 123, the ratio of the transission is changed by one step from the third forward speed to the fourth forward speed.

The further sensor 202 ($S_R$) is installed to monitor the first position (R=102) of the selector 41 in the first path 101 of the gate 100. The line 150 denotes the range of the further sensor 202, i.e., this sensor can be designed and installed to monitor (and to report to the control unit 33) the position 102 as well as a certain number of positions around the position 102 of the selector 41.

The additional sensor 201 ($S_N$) transmits to the control unit 33 signals denoting that the selector 41 asssumes the neutral position (N=103) as well as a range 151 of positions around the position 103.

FIG. 2 further shows a range 152 of intermediate positions of the selector 41 between the positions 102 and 103. Such intermediate position(s) of the selector 41 is or are monitored (and appropriate signals transmitted to the control unit 33) by the additional sensor 201 as well as by the further sensor 202.

In accordance with a modification, the additional sensor 201 can monitor the range 153 of positions of the selector 41; this range includes the position 104 and partly overlaps the range 151.

Furthermore, it is possible to employ still another sensor (not shown) which monitors the range 154 including the position M=121 of the selector 41 in the second path 120. By the same token, the shifting means can employ a sensor which monitors a range of positions of the selector 41 including the position 122 and/or a range of positions including the position 123.

Figure 3:
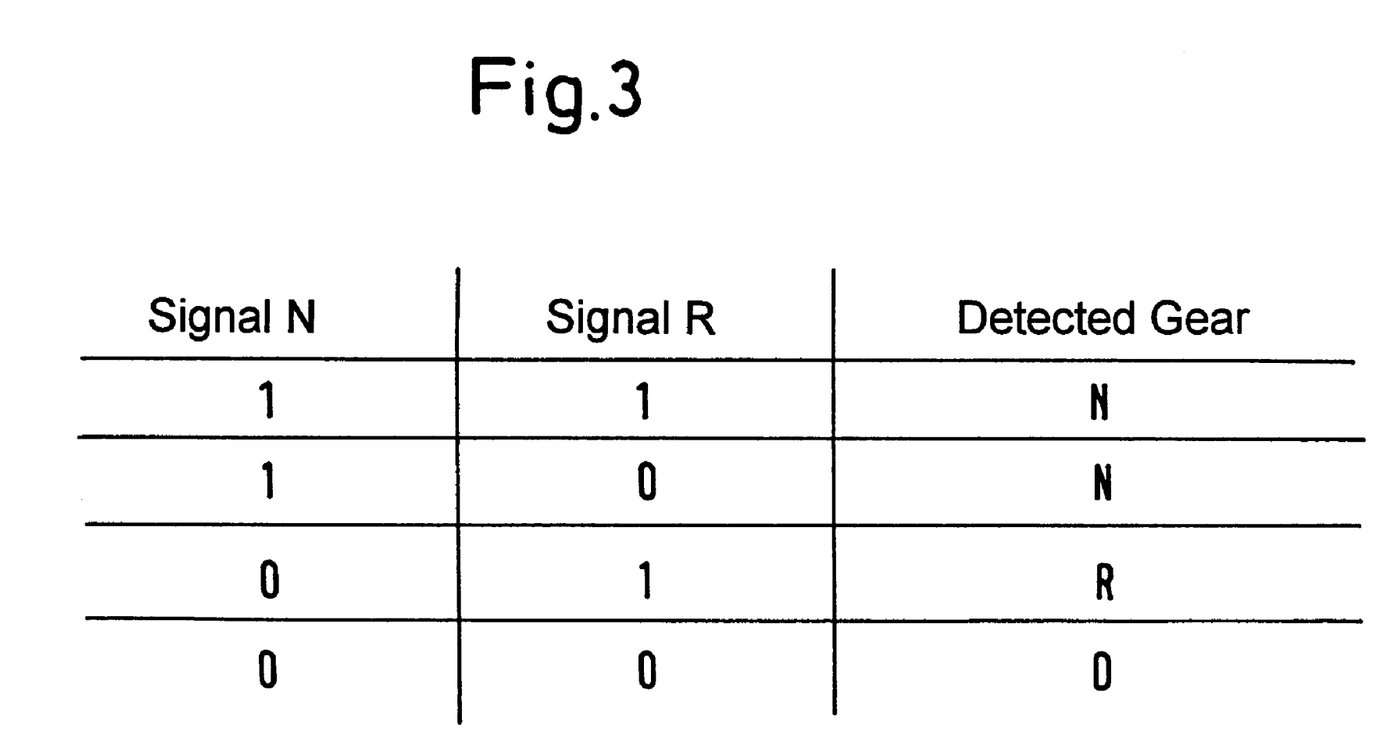
FIG. 3 shows a table wherein the information denotes various combinations of signals from the additional and further sensors which are associated with the control unit.

The table of FIG. 3 includes a first column which contains information pertaining to the signals transmitted by the further sensor 202 which is assumed to be operative to monitor the positions of the selector 41 within the range 150 (including the position R=102) shown in FIG. 2. The second column of the table shown in FIG. 3 contains information pertaining to signals being transmittable by the additional sensor 201 (SN) within the range 151 (including the position N=103) shown in FIG. 2. The third column denotes the positions of the selector 41 as recognized or ascertained by the control unit 33 in response to signals transmitted by the sensor 201 and/or 202.

The second row of the table of FIG. 3 indicates that the selector 41 is held in the position N when the control unit 33 receives signals from the sensors 201 and 202. At such time, the selector 41 can be in a position within the range 152.

The third row of the table which is shown in FIG. 3 indicates that the control unit 33 receives a signal from the sensor 202 but no signal from the sensor 201; therefore, the selector 41 is located within the range 151 including the position N=103.

The fourth row in the table of FIG. 3 indicates that the selector 41 occupies a position within the range 150 because the control unit 33 receives a signal from the sensor 201 but no signal from the sensor 202. The range 150 includes the position R=102.

The last row in the table of FIG. 3 indicates that neither of the sensors 201, 202 transmits a signal to the control unit 33; therefore, the selector 41 is in the position D=104.

Figure 4:
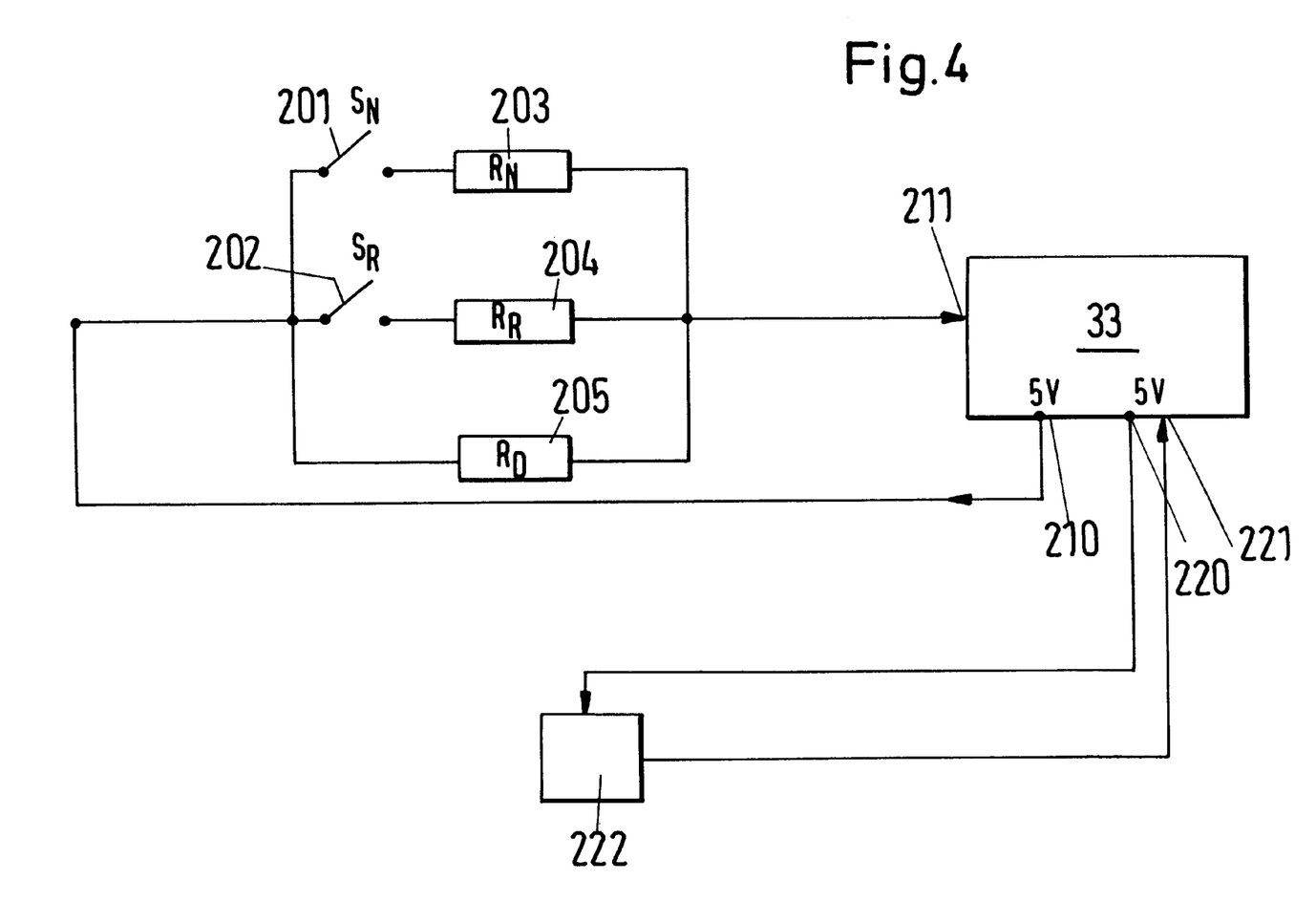
FIG. 4 illustrates one presently preferred arrangement of signal transmitting connections between the control unit, a first sensor which normally monitors all positions of the gear selecting lever, an additional sensor which monitors a first range of positions of the selecting lever, and a further sensor which monitors a second range of positions of the selecting lever.

FIG. 4 shows an arrangement of sensors 201 ($S_N$), 202 ($S_R$) which constitute switches and are installed to detect the positions of the selector 41 within the range 151 including the position N=103 shown in FIG. 2, and within the range 150 including the position R=102 of FIG. 2. FIG. 4 shows but one of several possible utilizations of the sensors (switches) 201, 202.

The connection between the assembly including the selector 41 and the control unit 33 includes a signal or data transmitting interface. The electronic circuitry comprising the control unit 33 includes a 5-volt output connection 210 which supplies energy to the sensors 201, 202, and a signal input 211 which transmits signals to an analog/digital converter of the control unit 33. The sensors (switches) 201, 202 are connected in series with resistors 203 ($R_N$) and 204 ($R_R$), and these resistors are connected in parallel with a third resistor 205 ($R_D$).

When the sensors (switches) 201, 202 are open, i.e., when the selector 41 is not located in the portion 102 or 103 of the path 101 defined by the gate 100, the potential at the input 211 of the control unit 33 is determined by the resistor 205. If the sensor (switch) 201 is closed, the resistors 203 and 205 determine the characteristics of the signal at the input 211. If the sensor (switch) 202 is closed, the characteristics of the signal at the input 211 of the control unit 33 are determined by the parallel-connected resistors 204 and 205. If the sensors (switches) 201 and 202 are closed, the characteristics of the signal at the input 211 of the control unit 33 are determined by the parallel-connected resistors 203, 204 and 205. The logic circuitry which processes the signals being applied to the input 211 is or can be designed in a manner as already explained with reference to the table of FIG. 3.

FIG. 4 further shows a sensor 222 (corresponding to the first sensor 42 of FIG. 1) which monitors the positions of the selector 41 in the paths 101 and 120. Alternatively, and as already pointed out hereinbefore, the sensor 222 can be replaced with two sensors, one for the path 101 and the other for the path 120. The control unit 33 has a second 5-volt output 220 which supplies energy to the sensor 222. The latter transmits signals to the input 221 of the control unit 33.

An additional sensor (not shown) can be connected with the control unit 33 to transmit signals denoting the displacement of the selector 41 from the path 101 into the path 120 and/or vice versa.

An important advantage of the improved means for shifting the gear assembly in the case of the transmission 2 is that, if the sensor 222 (42) happens to malfunction, the sensors 201, 202 can furnish the control unit 33 with signals which are processed and transmitted to the electric motors 50, 51 in order to enable the actuator 30 to ensure automatic shifting of the transmission 2 into the desired gears R, N and D. At the very least, the control unit 33 can continue to distinguish between the neutral gear N, the reverse gear R and a forward gear D, even when the sensor 222 is out of commission.

When the transmission 2 is to operate as an automated or automatic transmission, the operator of the motor vehicle causes the control unit 33 to select a particular gear by way of the selector (lever) 41 (or by way of a switch which, if used, is normally installed at or on the steering wheel). As a rule, the gears include a reverse gear, a neutral gear and a forward gear range with automatic shifting between various forward speeds. In addition, the ratio of the transmission 2 can be changed manually by way of the selector 41 which can be manipulated to shift the transmission into idle gear (position M in FIG. 2), to shift into a higher forward gear (to the position 123 in FIG. 2) or to shift into a lower forward gear (to the position 122 of FIG. 2). The positions of the selector 41 in the transmission 2 of the present invention are monitored by the sensor 222, and the corresponding signals are transmitted to the input 221 of the control unit 33 by way of the conductor 43 (shown in FIG. 1). Such signals can be transmitted by a data bus (such as a CAN bus), and the signals which are being transmitted by the sensor 222 can be analog signals, PWM signals or digital signals. Since the selector 41 normally constitutes the only means available to the operator of the motor vehicle to communicate with the automatic or automated transmission 2, i.e., with the control unit 33, it is even more desirable and advantageous to ensure that the failure of the sensor 222 to operate properly does not prevent the control unit 33 from continuing to guarantee satisfactory or at least adequate operation of the transmission as an automated or automatic transmission because the input 211 of the control unit 33 receives signals from the additional sensor 201 and from the further sensor 202.

It will be seen that, in accordance with the proposal of the present invention, redundancy is to involve the provision of at least one (such as 201) or more (such as 201 and 202) sensors. In accordance with a presently preferred embodiment, the additional sensor or sensors monitor the position 102 (R) and/or 103 (N) of the selector 41 in the first path 101 of the gate 100.

FIG. 2 shows a sensor $S_R$ which corresponds to the sensor 202 of FIG. 4 and monitors the range 150 of positions of the selector 41, and a sensor $S_N$ which corresponds to the sensor 201 and monitors the range 151 of positions of the selector 41. Such arrangement of (additional and/or further) sensors in addition to the sensor 222 constitutes one of the presently preferred embodiments of the improved transmission. Thus, when the sensors 201, 202 fail to transmit signals denoting the dwell of the selector 41 within the range 150 or 151 of positions in the first path 101, the selector 41 is located within the range 153, i.e., the transmission 2 is evidently in a forward gear and the operator of the motor vehicle cannot be confronted with a situation in which the vehicle is set to move rearwardly rather than in a desired (forward) direction.

The sensors 201, 202, 222 can constitute pushbuttons or switches (e.g., touch-free switches such as Hall effect sensors or reed switches or switches actuatable by a cam 61 (FIG. 1) or the like on or of or merely movable with the selector 41) which can be connected in series with resistors (e.g., in a manner as already described with reference to FIG. 4) to establish several paths for the flow of electric current to the corresponding input or inputs of the control unit 33 or an equivalent control circuit. The resistors can be replaced by capacitors or inductances. Furthermore, the sensor can be installed ahead of or behind the parallel-connected resistors, inductances or capacitances as considered in the direction of current flow to the corresponding input or inputs of the control unit 33.

It is clear that the resistor 205 or an equivalent thereof is optional.

It is further clear that the control unit 33 normally receives signals from one or more additional sensors which are not shown in the drawings because they are known in the art of automatic or automated transmissions and/or clutches for use in the power trains of motor vehicles, and also because they form no part of the present invention. Reference may be had, for example, to commonly owned U.S. Pat. No. 5,725,456 granted Mar. 10, 1998 to Robert Fischer et al. for "METHOD OF REGULATING THE OPERATION OF A TORQUE TRANSMISSION APPARATUS". This patent discloses and shows a control unit for an automated clutch which is in series with a transmission. The disclosure of this patent, as well as of our German patent applications Serial Nos. 198 06 239.7 (filed Feb. 16, 1998) and 198 18 939.7 (filed Apr. 28, 1998) is incorporated herein by reference. For example, the control unit 33 can further receive signals from sensors which monitor the RPM of the input and/or output shaft of the transmission 2, the RPM of the output shaft of the engine 4, the speed of the motor vehicle (such as the RPM of the axle 6a or 6b) and/or others.

The provision of discrete energy sources (210 and 221) for the sensors 201, 202 on the one hand and the sensor 222 on the other hand also constitutes a desirable safety feature of the improved gear shifting means.

If at least one of the sensors 201, 202, 222 is a Hall effective sensor, the selector 41 can carry one or more magnets which cause the Hall effective sensor to transmit signals denoting the then position of the selector. Alternatively, the sensors can include mechanical switches or pushbuttons which are actuated by a cam or by any other suitable actuating element provided on or sharing the movements of the selector 41. It is also possible to utilize one or more sensors which include or constitute potentiometers. Such sensor or sensors can be coupled to the selector 41 by a lever or by a linkage.

Still further, at least the sensor 222 can constitute a binary position code sensor. Such sensor can furnish a code for each position of the selector 41 in the path 120 and/or 101.

Referring again to FIG. 4, the sensors which are shown therein can be replaced by or used jointly with sensors which transmit to the input 211 and/or 221 analog signals for conversion into digital signals by one or more A/D converters of the control unit 33.

The connection between at least one sensor and the control unit 33 can comprise a data bus, such as a CAN bus. This is desirable because a data bus constitutes a highly reliable signal transmitting arrangement. Furthermore, and if the motor vehicle already comprises a CAN bus, only minor additional circuitry is required to employ the already available bus as a means for transmitting signals from one or more sensors to the control unit 33.

It is also possible to provide a pulse width modulator (PWM) as a means for transmitting data from one or more sensors, by way of an interface, and on to the control unit 33. The information pertaining to the position of the selector 41 or an equivalent selector is denoted by the duration of intervals elapsing between the rising and falling flanks of the signal. The resort to such mode of signal transmission is desirable in many instances because it necessitates the utilization of a relatively simple circuit. The PWM signals can have a constant frequency.

In accordance with still another embodiment, the transmission of data from the sensors which monitor the positions of the selector 41 to the control unit 33 can be effected by way of a serial interface via two conductors. The control unit generates a clocking pulse which can be transmitted to the selector 41 by a data link constituted by one of the two conductors. The other conductor is utilized as a data link which enables the control unit to read the information supplied by the selector 41 in response to the clocking pulse. The clocking pulse can act as a storage signal at a low level so that the signals denoting the positions of the selector 41 are stored in a memory or in a shift register. Furthermore, each clocking pulse initiates a radout of memorized information denoting the previously memorized or signaled position of the selector. The control unit which embodies or cooperates with the just described serial interface transmits clocking pulses until the readout of all memorized information is completed. The electronic circuitry which is associated with the selector ensures that the next clocking pulse following a readout of all memorized signals is again utilized as a storage signal.

For example, the electronic circuitry which is utilized to transmit signals from one or more sensors to the selector 41 or an analogous selector can constitute an electronic module which counts the clocking pulses and stores each $n+1^{st}$ signal as a storage signal, n being the number of readout signals.

In accordance with still another embodiment of the present invention, one can resort to a capacitor, the charge of which can be released by a switchable transistor, as a means for releasing the memorized signal at a low level. To this end, the capacitor is first charged by way of an electric resistor to a sufficiently high level to the read-in of new data from the memory or shift register. If the capacitor is at least substantially discharged when the read-in is completed, the read-in data are stored or frozen in the memory. Thus, the capacitor is a component of an R-C link. The time constant of the R-C link is preferably a function of the clocking frequency.

The clocking frequency must distinguish between a readout from the memory or shift register and a reading-in of information into the memory or shift register. During readout, the capacitor should not accept a high level and should not become discharged.

The just described arrangement renders it possible to merely employ two conductors for the transmission of information from the sensor 222 to the control unit 33 in order to detect the position of the selector 41 within the paths 101, 120 of the gate 100 when the operation of the system including the control unit, the selector and the associated sensors is normal. As a result of wiring of the sensors 201, 202, the novel arrangement renders it possible to employ only two additional conductors to furnish to the control unit 33 signals denoting the position of the selector 41 when the sensor 222 is out of commission.

Depending on the voltage of the battery in the motor vehicle, the high level can assume values in the range of between about 1.8 and 4 volts, and the low level can assume values in the range of between about 0.5 and 1.7 volt.

To summarize, the sensor 201 and/or 202 can be put to use when the sensor or detector 222 is inoperative. The sensors 201, 202 transmit signals if the selector 41 assumes the position R=102 or N=103 (range 150 or 151). If the sensors 201, 202 transmit signals denoting that the selector 41 assumes the position N, the control unit 33 ensures that the motors 50, 51 cannot shift the transmission 2 into reverse or into a forward gear. If the signals from the sensors 201, 202 denote that the transmission is in reverse gear, the vehicle can be driven in reverse. If the sensors 201, 202 transmit signals denoting that the transmission is not in neutral or reverse gear, the vehicle can be driven forwardly. Thus, even if the sensor or detector 222, which normally monitors all positions of the selector 41 in the path 101 as well as in the path 120, fails to function properly, the operator is still in a position to drive the motor vehicle with a requisite degree of safety.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of transmissions for use in the power trains of motor vehicles and, therefore, such adaptations should and are intended to be comprehended within the meaning and range of equivalence of the appended claims.

What is claimed is:

1. A transmission for use in a power train of a motor vehicle, comprising:

a gear assembly shiftable into and between a plurality of gears including reverse, neutral and forward gears; and means for shifting said assembly to and between said gears, including:

a gate defining first and second gear selecting paths, a gear selector movable along said first path to a plurality of positions including first, second and third positions in which said assembly is respectively in said reverse, neutral and forward gears, said selector being movable between said third position and said second path and manually along said second path, a signal receiving, processing and transmitting control unit, at least one actuator responsive to processed signals transmitted by said control unit and arranged to move said means for shifting to one of said plurality of gears as a function of signals transmitted by said control unit, at least one first sensor arranged to monitor the positions of said selector in said paths and to transmit signals to said control unit, and at least one additional sensor arranged to monitor the presence or absence of said selector in a predetermined one of said plurality of positions and to transmit signals to said control unit, so as to provide a backup sensor in case of malfunction of said at least one first sensor.

2. The transmission of claim 1, wherein said predetermined one of said plurality of positions of said selector in said first path is one of said first, second and third positions.

3. The transmission of claim 1, wherein at least one of said sensors includes a switch.

4. The transmission of claim 1, wherein at least one of said sensors includes a pushbutton.

5. The transmission of claim 1, wherein at least one of said sensors includes a touch-free switch.

6. The transmission of claim 5, wherein said switch includes a Hall effect sensor.

7. The transmission of claim 5, wherein said switch includes a reed switch.

8. The transmission of claim 1, wherein at least one of said sensors includes a switch which is actuatable to transmit signals to said control unit and said selector includes means for actuating said switch.

9. The transmission of claim 8, wherein said actuating means comprises a cam on said selector.

10. The transmission of claim 1, comprising at least one further sensor arranged to monitor the presence or absence of said selector in another of said plurality of positions in said first path and to transmit signals to said control unit.

11. The transmission of claim 10, wherein said predetermined one of said plurality of positions of said selector in said first path is one of said first, second and third positions.

12. The transmission of claim 10, wherein said other of said plurality of positions in said first path is one of said first, second and third positions.

13. The transmission of claim 10, wherein at least one of said sensors includes a switch.

14. The transmission of claim 10, wherein at least one of said sensors includes a pushbutton.

15. The transmission of claim 10, wherein at least one of said sensors includes a touch-free switch.

16. The transmission of claim 15, wherein said switch includes a Hall effect sensor.

17. The transmission of claim 15, wherein said switch includes a reed switch.

18. The transmission of claim 10, wherein at least one of said sensors includes a switch which is actuatable to transmit signals to said control unit and said selector includes means for actuating said switch.

19. The transmission of claim 18, wherein said actuating means comprises a cam on said selector.

20. The transmission of claim 10, wherein said selector has an intermediate position between said first and second positions in said first path, said at least one additional sensor and said further sensor being arranged to monitor said intermediate position of said selector and to transmit corresponding signals to said control unit.

21. A transmission for use in a power train of a motor vehicle, comprising:

a gear assembly shiftable into and between a plurality of gears including reverse, neutral and forward gears; and means for shifting said assembly to and between said gears, including:

a gate defining first and second gear selecting paths, a gear selector movable along said first path to a plurality of positions including first, second and third positions in which said assembly is respectively in said reverse, neutral and forward gears, said selector being movable between said third position and said second path and manually along said second path, a signal receiving, processing and transmitting control unit, at least one actuator responsive to processed signals transmitted by said control unit and arranged to move said means for shifting to one of said plurality of gears as a function of signals transmitted by said control unit, at least one first sensor arranged to monitor the positions of said selector in said paths and to transmit signals to said control unit, and at least one additional sensor arranged to monitor the presence or absence of said selector in said first position and to transmit signals to said control unit, so as to provide a backup sensor in case of malfunction of said at least one first sensor.

22. The transmission of claim 21, wherein at least one of said sensors includes a switch.

23. The transmission of claim 21, wherein at least one of said sensors includes a pushbutton.

24. The transmission of claim 21, wherein at least one of said sensors includes a touch-free switch.

25. The transmission of claim 24, wherein said switch includes a Hall effect sensor.

26. The transmission of claim 24, wherein said switch includes a reed switch.

27. The transmission of claim 21, wherein at least one of said sensors includes a switch which is actuatable to transmit signals to said control unit and said selector includes means for actuating said switch.

28. The transmission of claim 27, wherein said actuating means comprises a cam on said selector.

29. The transmission of claim 21, comprising a further sensor arranged to monitor the presence or absence of said selector in said second position and to transmit signals to said control unit.

30. The transmission of claim 29, wherein at least one of said sensors includes a switch.

31. The transmission of claim 29, wherein at least one of said sensors includes a pushbutton.

32. The transmission of claim 29, wherein at least one of said sensors includes a touch-free switch.

33. The transmission of claim 32, wherein said switch includes a Hall effect sensor.

34. The transmission of claim 32, wherein said switch includes a reed switch.

35. The transmission of claim 29, wherein at least one of said sensors includes a switch which is actuatable to transmit signals to said control unit and said selector includes means for actuating said switch.

36. The transmission of claim 35, wherein said actuating means comprises a cam on said selector.

37. The transmission of claim 29, wherein said selector has an intermediate position between said first and second positions in said first path, said at least one additional sensor and said further sensor being arranged to monitor said intermediate position of said selector and to transmit corresponding signals to said control unit.

38. A transmission for use in a power train of a motor vehicle, comprising:
a gear assembly shiftable into and between a plurality of gears including reverse, neutral and forward gears; and
means for shifting said assembly to and between said gears, including:
a gate defining first and second gear selecting paths,
a gear selector movable along said first path to a plurality of positions including first, second and third positions in which said assembly is respectively in said reverse, neutral and forward gears, said selector being movable between said third position and said second path and manually along said second path,
a signal receiving, processing and transmitting control unit,
at least one actuator responsive to processed signals transmitted by said control unit and arranged to move said means for shifting to one of said plurality of gears as a function of signals transmitted by said control unit,
at least one first sensor arranged to monitor the positions of said selector in said paths and to transmit signals to said control unit,
at least one additional sensor arranged to monitor the presence or absence of said selector in a predetermined one of said first, second, and third positions and to transmit signals to said control unit, and
a further sensor arranged to monitor the presence or absence of said selector in one of said selected positions in said second path and to transmit signs to said control unit, wherein said at least one additional sensor and said further sensor provide backup sensors in case of malfunction of said at least one first sensor.

39. The transmission of claim 38, wherein said predetermined one of said plurality of positions of said selector in said first path is one of said first, second and third positions.

40. The transmission of claim 38, wherein said assembly has a plurality of higher and lower forward gears, said selected positions of said selector including an idle position, a position in which said selector effects a shifting of said assembly from a higher to a lower forward gear, and a position in which said selector effects a shifting of said assembly from a lower to a higher forward gear.

41. The transmission of claim 38, wherein at least one of said sensors includes a switch.

42. The transmission of claim 38, wherein at least one of said sensors includes a pushbutton.

43. The transmission of claim 38, wherein at least one of said sensors includes a contactfree switch.

44. The transmission of claim 43, wherein said switch incudes a Hall generator.

45. The transmission of claim 43, wherein said switch includes a reed switch.

46. The transmission of claim 38, wherein at least one of said sensors includes a switch which is actuatable to transmit signals to said control unit and said selector includes means for actuating said switch.

47. The transmission of claim 46, wherein said actuating means comprises a cam on said selector.

48. The transmission of claim 38, wherein said selector has an intermediate position between said first and second positions in said first path, said at least one additional sensor and said further sensor being arranged to monitor said intermediate position of said selector and to transmit corresponding signals to said control unit.

* * * * *